Feb. 26, 1952 H. L. McFARLAND 2,587,189
ARTIFICIAL BAIT
Filed Sept. 25, 1947
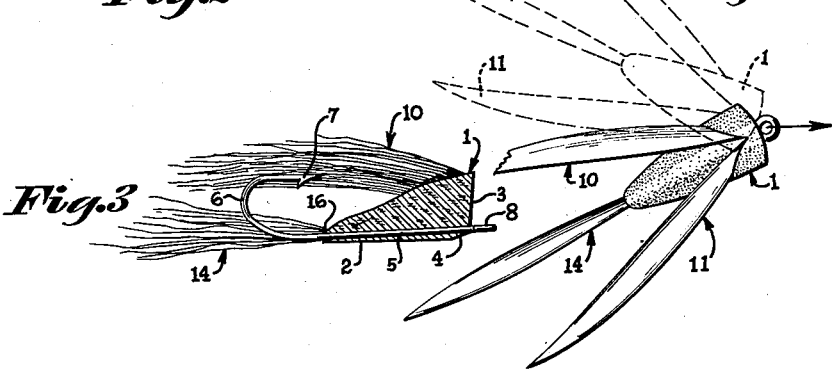
Inventor
H. L. McFARLAND Patented Feb. 26, 1952

2,587,189

UNITED STATES PATENT OFFICE 2,587,189

ARTIFICIAL BAIT

Howard L. McFarland, Beaumont, Tex., assignor to C. K. Farr and J. W. Turek, Beaumont, Tex.

Application September 25, 1947, Serial No. 776,024

1 Claim. (Cl. 43—42.27)

This invention relates to an artificial bait or fish lure, and has for its general object the provision of a lure characterized by optimum performance both in the air, while being cast, and in the water.

More specifically stated, an object of the invention is to provide a fish lure having a body with rearwardly divergent side wings or hackles so mounted as to move in a direction of mutual approach when the lure moves forward, and to recover their repose position when the lure is stationary, thus assuming a wing-like movement when the lure is intermittently jerked.

Another object of the invention is to provide side and tail hackles which normally conceal the hook, as well as act as fenders to prevent fouling of the hook.

Still another object of the invention is to provide a lure in which the side hackles are so mounted as to contribute but little to the wind resistance of the lure when being cast, and in which vacuum plays a part in drawing the hackle substantially into the displacement path of the body of the lure.

Still another object of the invention is the provision of a lure having a flat front face from which the water is spilled alternately in opposite directions as the lure is drawn forward, giving it a life-like wiggling motion in a horizontal plane.

Another object of the invention is to provide a lure that normally floats inclined downward toward the tail when still, and which planes toward a horizontal position when moved forward, giving it a teetering movement in a vertical plane when subjected to a series of jerks.

Other objects of the invention will appear as the following description of a preferred and practical embodiment thereof proceeds.

In the drawing throughout the several figures of which the same reference characters have been used to denote identical parts:

Figures 1 to 4, inclusive, illustrate the lure in its dry state, while Figures 5, 6, 7 and 8 show it when in wet condition.

Figure 1 is a top plan view;
Figure 2 is a side elevation;
Figure 3 is a longitudinal vertical section;
Figure 4 is a bottom plan view;
Figure 5 is a side elevation showing the position of the lure, floating when still;
Figure 6 is a side elevation showing the position of the lure in the water when moving forward;
Figure 7 is a top plan view of the lure in the water, the full line position indicating the repose position of the side hackles, the broken lines indicating the position of the side hackles assumed when the lure is in motion;
Figure 8 is a plan view of the lure when in motion in the water, the full and broken line positions illustrating its oscillatory movement due to alternate spilling of the displaced water from opposite sides of the front face.

Referring now in detail to the several figures, the numeral 1 represents the body of the lure which is of light density as though made of cork, having the general shape of a convex frusto-cone cut away in a plane parallel to its axis and close thereto to provide a flat bottom 2, the body tapering toward the rear, and terminating forwardly in a flat transverse front face 3, which inclines slightly forwardly with respect to the plane of the bottom 2, there being a narrow transverse flat facet 4 joining the lower edge of the front face 3 and the forward edge of the bottom 2, and extending upwardly at a small angle to the plane of the bottom. The sides and top of the body are smoothly convex both longitudinally and laterally.

The shank 5 of a hook 6 passes longitudinally through the lower part of the body, slightly tilted with respect to the plane of the bottom, its forward end emerging in the juncture line between the facet 4 and front face 3, its rear end portion emanating at a point somewhat closer to the plane of the bottom 2. The shank 5 is suitably fixed in the body so that the bight of the hook extends upwardly, the size of the hook being such that the barbed point 7 does not extend materially higher above the plane of the bottom than the top of the front face 3. The exposed forward end of the shank 5 is formed into an eye 8, for attachment to a line. The top surface of the body tapers generally downward longitudinally from the top of the front face to the rear apex with a reverse curvature, being convex at the front and rear but slightly concave intermediately, providing a wide throat between the body and the point of the hook.

The body 1 close to the front face 3, is provided with slots 9, symmetrically placed with respect to the medial longitudinal line of the top, beginning at their forward ends adjacent said line, and extending divergently part way down the sides of the body. A pair of side hackles 10 and 11 are provided, each consisting of a bunch of hairs 12, flatly massed at their base ends and glued together with a suitable adhesive to form a stiff flat based tuft, which tufts are inserted in the respective slots 9 and glued therein. The side hackles, thus inserted, extend divergently from the body in a rearward direction to a point beyond the hook and laterally thereof to conceal the point. The glue line 13, which binds the base ends of the hairs, extends for some little distance beyond the body, imparting bodily springiness to the hackles, so that they move in the direction of mutual approach when the lure is drawn through the water, and return to their spread repose position when the lure is stationary, giving the hackles a wing-like movement. The hairs of the side hackles are of various length, so that said hackles each terminates in a point when wet.

A tail hackle 14 is provided, comprising a bunch of hairs 15, the base ends of which are glued into a socket 16, which at least partially surrounds the shank 5 at its point of emanation from the bottom, and conceals the extending portion of the shank adjacent the bight of the hook. The hairs 15 are of various lengths, so that their free ends come together in a point when wet. The side and tail hackles function as weed fenders to prevent the hook from fouling.

Figure 5 shows that the center of buoyancy is forward of the center of gravity of the lure when the latter is in horizontal position, so that when in repose position it floats with the rear end depressed. When it is drawn through the water, the flat bottom planes against the water, tilting the lure to a more nearly horizontal position. Thus when the line is given a series of small jerks, as is customary, the lure executes a series of teetering movements, from inclined, as shown in Figure 5, to horizontal, as shown in Figure 6.

Since the front of the lure is flat and transverse, it will be in unstable balance with respect to the resistance of the water in front of it, which it must displace when drawn forward, so that it first tilts to one side, permitting the displaced water to plane off of that side. Then being momentarily relieved of the displacement pressure by the flowing water, it swings back to normal position and beyond, due to its inertia, spilling the water in the opposite direction. Thus while it is in forward motion, the lure swings from side to side, giving it a life-like wiggling movement.

The angular relation of the facet 4 to the plane of the bottom 2, permits the lure to be taken out of the water without raising too much water and creating disturbance.

The curved contours of the body 1 of the lure are substantially streamlined in the direction of air flow when the lure is being cast, either in wet or dry condition, so that air resistance is minimized and a longer cast made possible. Furthermore, the partial vacuum created behind the body of the lure is satisfied by air flowing in from above and from both sides, pressing the side hackles inward and downward, so that they lie substantially confined within the path of movement of the body, still further reducing air resistance.

While I have in the above description disclosed what I believe to be a preferred and practical embodiment of my invention, it will be understood by those skilled in the art that the specific structure and arrangement of parts, as shown, is by way of example, and does not rule out such variations of structure as may still embody the inventive concept.

What I claim as my invention is:

A fish lure comprising a tapered body having a substantially flat bottom and a substantially flat front end, the remaining sides of said body converging rearwardly to define an apex, a hook extending longitudinally through said body having an eye extending outwardly at the front end thereof, said hook having a shank extending rearwardly of the apex and an upright bight portion in the medial longitudinal plane of said body perpendicular to its bottom, the forward portion of said body immediately forward of said hook being provided with divergent slots, each slot being in a plane at an angle other than a right angle to the bottom and the front face, said slots being symmetrically divergent with respect to said medial plane, side hair hackles adhesively secured in said slots and extending rearwardly thereof and laterally of the hook bight, each of said hackles having its end within said slots defining a flat formation, and said hackles each having an appreciable portion outside said slot and adjacent the body glued together, defining stiff flat zones of said hackles emanating from said slot.

HOWARD L. McFARLAND.

REFERENCES CITED

The following references are of record in the file of this patent:

UNITED STATES PATENTS

| Number | Name | Date |
| --- | --- | --- |
| D. 101,906 | Weaver | Nov. 10, 1936 |
| 1,299,432 | Dickens | Apr. 8, 1919 |
| 1,336,227 | Hayes | Apr. 6, 1920 |
| 1,611,635 | Dills | Dec. 21, 1926 |
| 1,876,342 | Peckinpaugh | Sept. 6, 1932 |
| 1,975,218 | Worden | Oct. 2, 1934 |
| 2,235,331 | Pugh | Mar. 18, 1941 |